United States Patent
Asplund

(10) Patent No.: US 8,776,969 B2
(45) Date of Patent: Jul. 15, 2014

(54) OVERLOAD RESTRICTION IN SYSTEM FOR ELECTRICAL VEHICLES

(75) Inventor: Gunnar Asplund, Solna (SE)

(73) Assignee: Elways AB, Solna (SE)

( * ) Notice: Subject to any disclaimer, the term of this patent is extended or adjusted under 35 U.S.C. 154(b) by 0 days.

(21) Appl. No.: 13/638,366

(22) PCT Filed: Mar. 31, 2011

(86) PCT No.: PCT/SE2011/050385
§ 371 (c)(1),
(2), (4) Date: Sep. 28, 2012

(87) PCT Pub. No.: WO2011/123054
PCT Pub. Date: Oct. 6, 2011

(65) Prior Publication Data
US 2013/0020163 A1     Jan. 24, 2013

(30) Foreign Application Priority Data

Apr. 1, 2010   (SE) ...................................... 1000331

(51) Int. Cl.
A63H 19/30        (2006.01)
(52) U.S. Cl.
USPC ........................ 191/29 R; 104/243
(58) Field of Classification Search
USPC ....... 191/22 R, 29 R, 30, 31, 32, 33 R; 246/9, 246/65, 67, 69
See application file for complete search history.

(56) References Cited

U.S. PATENT DOCUMENTS

| | | | | |
|---|---|---|---|---|
| 3,914,562 A * | 10/1975 | Bolger | ............................ | 191/10 |
| 4,227,595 A * | 10/1980 | Hamada | ............................ | 191/2 |
| 4,969,400 A * | 11/1990 | Burg et al. | .................... | 104/247 |
| 5,764,127 A * | 6/1998 | Hore et al. | ..................... | 336/143 |
| 6,011,508 A * | 1/2000 | Perreault et al. | .............. | 342/350 |
| 6,374,748 B1 * | 4/2002 | Shiwaku et al. | .............. | 104/243 |
| 8,531,153 B2 * | 9/2013 | Baarman et al. | .............. | 320/108 |

(Continued)

FOREIGN PATENT DOCUMENTS

WO       93/10995      6/1993
WO    2007/056804 A1   5/2007

OTHER PUBLICATIONS

International Search Report issued on Jun. 30, 2011 by the SE International Searching Authority in International Application No. PCT/SE2011/050385.

(Continued)

*Primary Examiner* — Jason C Smith
(74) *Attorney, Agent, or Firm* — Raymond R. Ferrera; Adam and Reese LLP

(57) ABSTRACT

An arrangement for overload restriction associated with a system adapted for electrically driving a vehicle along a roadway. The vehicle is provided with a current collector, which is displaceable up and down and sideways in relation to the direction of transportation, in order to be brought into mechanical and electrical contact with elongated tracks positioned below the roadway and comprising a conductor adapted to be supplied with current and put under voltage. The arrangement comprises a circuit for limiting the momentary power outlet connected to said vehicle-external power source and being adapted to supply power to said conductor within the roadway section via said switch when the vehicle passes.

8 Claims, 4 Drawing Sheets

(56) References Cited

U.S. PATENT DOCUMENTS

Figure 1A:
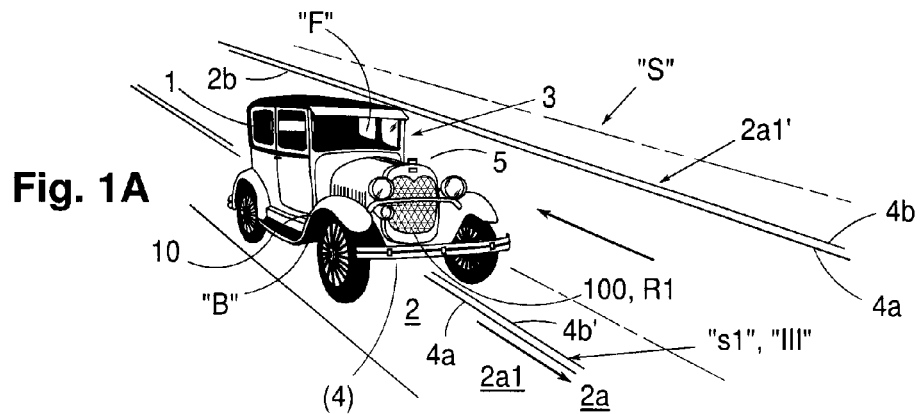

| | | | |
|---|---|---|---|
| 8,544,622 B2* | 10/2013 | Vollenwyder et al. | 191/10 |
| 2011/0061559 A1* | 3/2011 | Lund | 104/119 |
| 2011/0266109 A1* | 11/2011 | Meins et al. | 191/29 R |
| 2013/0020164 A1* | 1/2013 | Asplund | 191/29 R |
| 2013/0020165 A1* | 1/2013 | Asplund | 191/29 R |
| 2013/0126287 A1* | 5/2013 | Kanemori et al. | 191/29 R |

OTHER PUBLICATIONS

Written Opinion of the International Searching Authority issued on Jun. 30, 2011 by the SE International Searching Authority in International Application No. PCT/SE2011/050385.

International Preliminary Report on Patentability issued on May 15, 2012 by the SE International Preliminary Examining Authority in International Application No. PCT/SE2011/050385.

* cited by examiner

OVERLOAD RESTRICTION IN SYSTEM FOR ELECTRICAL VEHICLES

TECHNICAL FIELD OF THE INVENTION

This invention refers generally to an arrangement for overload restriction, said arrangement being related to vehicles having an arrangement which is adapted to be able to elevate and lower contact means and/or a contact device as current collector, with each vehicle being adapted to a system appropriate for electrically propellable vehicles and more particularly to such system in which i.a. one or more batteries and/or a set of batteries for power adaptation and energy storage are intended for being able to propel the vehicle rolling along a stretch of a roadway.

Systems of this type are based on utilizing a specifically designed stretch of the road or roadway wherein the surface of this stretch of the roadway exhibits at least one track in the form of groove and in which track two or more parallel electric conductors or strips with a conductor surface which may be subjected to power or voltage are disposed and which preferably are provided with uncovered and uninsulated contact surface sections.

In accordance with the instructions of the present invention such system is to comprise; "a" a plurality of roadway sections or portions subdividing the total stretch of the roadway and each allotted to one or more electrically conductive surfaces, such as conductors or strips, said roadway portions being connectable over a switch to one or more stationary electric stations serving as a source of power or energy external to vehicles so as thereof i.a. to charge batteries belonging to vehicles and/or sets of batteries intended primarily to propel the vehicle by means of said set of batteries along the stretch of the roadway and its roadway sections or portions and "b" one or more, over an individual electric motor or a plurality of motors, propellable vehicles, wherein each of said vehicles is to exhibit a control circuit controlling the power so as to create a chosen and required propelling effect and/or a speed adaptation and/or control.

The invention is to be applied to stretches of roadways in the form of public and private roads and along their road sections or portions but can also find use in industrial systems having different requirements of power and energy.

The invention has the purpose i.a. of concurrently with power charging of the set of batteries from the external source of energy supplying the power and the energy which will be required for a chosen power requirement for driving the vehicle upwards and over an upwardly rising portion of the roadway.

More particularly the present invention refers to such system in which a non-railbound vehicle, such as a freight vehicle, while being driven along chosen roadway sections or portions by means of the set of batteries allotted to the vehicle, can be supplied with supplementary power and energy, such as from the external source of power or alternatively from a source of power related to the vehicle, such as a diesel generator.

In this regard the present invention proposes a "first" source of power related to the vehicle, such as a diesel generator, a "second" source of power related to the vehicle, such as a battery set, and a "third" source of power separated from the vehicle and being disposed externally, such as two or more conductor surfaces, such as conductors or strips which may be placed under power and be included in tracks or grooves in successive roadway sections or portions with the conductors of a chosen roadway section being electrically insulated from corresponding conductors in an adjacent (preceding or succeeding) roadway section or portion.

The present invention is based on having two or more conductors built into one track or into individual tracks or grooves in their respective roadway sections or portions, with said tracks (not the conductors) extending continually from roadway section or portion to roadway section or portion.

The voltage which is allotted to these conductors can be an alternating voltage (AC-power) (with a vehicle-related rectifier) or a direct voltage (DC power). In choosing a DC-power one of the conductors can be positive, whereas the other conductor can be negative and an additional conductor can be allotted ground potential or zero potential, with the vehicle being operated at twice the value of the voltage.

With alternating voltage to the conductor of the roadway sections said voltage can to advantage be disposed in antiphase and symmetrically around a ground potential or zero potential.

The motor intended for driving the vehicle can be of the DC power type or of the AC-power type, with a converter being connected prior to the motor in the latter case.

BACKGROUND OF THE INVENTION

Methods, arrangements, and structures related to the technical field and character mentioned above are known earlier in a number of different embodiments.

With regard to electrically propellable vehicles, the latter can to advantage be categorized as "railbound vehicles" or as "non-railbound vehicles".

"Railbound vehicles" are driven along their stretch of the roadway and roadway sections on parallel rails disposed in their stretch of the roadway or on parallel rails laid open by sleepers or the like and guiding the fixed pairs of wheels of the vehicle.

"Non-railbound vehicles" are conveyed along their stretch of the roadway and roadway sections or portions over a road and are driven along the roadway sections or portions by guiding control equipment associated with the vehicle.

The present invention is based on and is intended to be used in the latter category and technology and is intended to be applied primarily to heavy trucks with or without connected trailers, wherein from Patent Publication U.S. Pat. No. 4,129,203-A a vehicle-related arrangement is known for letting contact springs disposed beneath the vehicle be brought upwards and downwards and sideways towards and to mechanical and electrical cooperation with or away from cooperation with non-insulated surface sections of the electric conductors (14) subject to voltage and associated with each roadway section or portion.

Utilizing an insulator (16) in a channel (18) which supports the conductors in the form of rails (14) is indicated here. A cover plate (20) provided with a slit (12) is removably attached to the upper and opposing wall portions of the channel (18), with this cover plate (20) being adjusted to a plane connecting to the upper surface (22) of the roadway section or portion.

Figure 2:
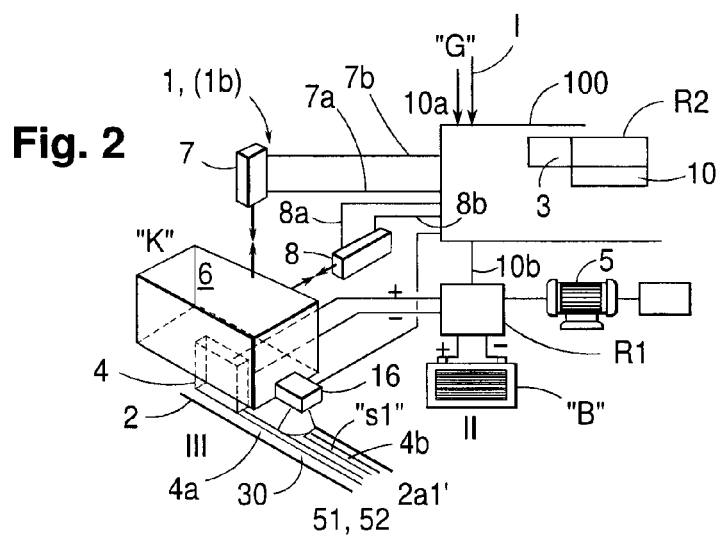
Figure 3:
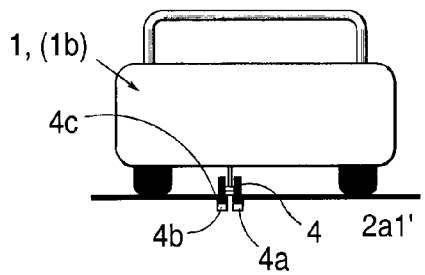

FIGS. 2 and 3, respectively, in the mentioned Patent Publication describe a vehicle-related table (98), to which an arm (10) is rotatably attached (94, 96, 99). Sensors (30) allotted to the table (98) generate signals which with regard to their phase and magnitude indicate the direction to and distance from an axis (99) of rotation to a slit (12) in the cover plate (20) which is based on changes in a generated magnetic field. The table (98) and arm (10) can be driven over a designated mechanism (31) by a motor (32) between predetermined limits and limit switches (40, 41) positioned there.

Patent publication WO 93/10995-A discloses an earlier known system for driving electrically controllable vehicles along a road and its roadway sections or portions.

FIG. 9 in the mentioned patent publication clarifies the basic structure of the system.

It is instructed here that the extension (14) of the roadway and its roadway portions are to be provided with electrically conductive road sections (300a-300f) wherein a roadway section may be considered to correspond to a roadway portion.

The vehicle (310) has an electric motor (320) and two (312, 314) or three (312, 312' and 314, respectively) contact springs lying therebelow and being adapted for mechanical and electrical contact with the electrically conductive conductors whose lengths are adapted to correspond to a chosen length (identically equal lengths) for utilized roadway sections or portions.

The electrically conductive conductors in the road sections (300a-399f) are disposed after each other with an intermediately oriented free space (302a-302e) so as thereby to prevent short circuits in consequence of dragging contact springs (312, 312', 314).

All other road sections (300a, 300d, 300f) are connected here continually to a reference voltage (ground potential), whereas the remaining road sections (300a, 300c, and 300e, respectively) are either directly connectable to a source (440) of DC voltage or can be connected over a connecting means (304a, 304b, 304c) to any appropriate electric power source (308) when a vehicle is in the vicinity.

When an embodiment having three contact springs is to be utilized the distance between them is to be chosen such, that two or three contacts always are in electric contact with two road sections exhibiting opposite polarities and that neither of the two contacts is to be able to short circuit the open space (302a-302e) between two adjacently positioned sections or portions.

For its function the system here requires specially structured vehicles (310), wherein the chosen distance between front (314) and rear (312, 312') contacts is to be identical and furthermore to be chosen somewhat greater than the equal lengths of the roadway sections (300b, 300d).

Thus, specially structured vehicles with front and rear contacts are required and in which each one of the utilized road sections (300a-300f) is to be chosen having equal lengths and are to be positioned behind each other in the direction of motion of the vehicle with equal mutual free and intermediately lying spaces (302a-302e).

The remainder of the Patent Publication shows the existence of a single conductor or rail subjected to voltage in a road section (Page 5, lines 11-13) and that a vehicle is to attract a voltage to a roadway section lying in front (Page 5, lines 19-21; page 6, lines 7-10; page 8, lines 28-32, respectively).

Furthermore it is indicated that bars or rails (16), which may be subjected to voltage, can be provided with side-positioned drainage tracks (Page 9, lines 1-4).

Lack (or presence) of an activating signal is to be able to influence a control unit (38) (Page 8, lines 23-27, respectively).

The necessary distance between vehicle-associated contacts is disclosed in lines 17-20 of page 10, and utilizing activity-initiated radio signals is suggested in lines 2-4 of page 11 and lines 1-16 of page 14, respectively.

Furthermore, in lines 21-23 of page 15 and lines 1-15 of page 16, utilizing a Hall element (240) and connecting it to an amplifier (246) is suggested. Furthermore, alternatives thereof are illustrated in lines 3-9 of page 17.

It is also known to have a vehicle driven electrically along a stretch of roadway by means of inductive transfer of energy active between a vehicle and a roadway section and a road portion lying therebelow.

As examples of this known technology reference is also made to the contents of Patent Publications U.S. Pat. No. 3,914,562-A and U.S. Pat. No. 4,007,817-A, respectively.

Patent publications WO 2007/056 804 A1 describe and disclose a plurality of means, devices and/or arrangements which have relevance when evaluating the significant features related to the prior art and also to the present invention. However, these means, devices and/or arrangements are only mentioned in general terms, and only a few or no suggested structure is disclosed.

The contents of this patent publication will be described in the following and coordinated under the following subsections;

a. Pairs of electrically conductive contacts or strips oriented along a roadway.
   b. Switching means to supply DC power to a roadway related pair of electrically conductive contacts or strips. (DC network).
   c. Vehicle related transmitter.
   d. Vehicle related pick-up arms.
   e. DC voltage difference between roadway related conductors, contacts or strips.
   f. Orientation of the roadway related conductive strips.
   g. Power supply system.
   h. Detector means or arrangements.
   i. Power supply to an adjacent pair of conducting strips.
   j. Sensor arrangements.
   k. Conditions for activating switching means.
   l. Battery arrangements.
   m. On-board charging engine.
   n. Overload cut-off and re-close switch.
   o. Safe conditions of bare electric roadway related electric conductors or strips.
   p. Use of DC voltage or AC voltage to supply power to the roadway related electric conductors or strips.
   q. Magnetic field sensor.
   r. Snow plough and blower arrangements.
   s. Electrical heating tape.

a. Pairs of Electrically Conductive Conductors or Strips Oriented Along a Roadway.

It is suggested in the above-mentioned International Patent Publications that each pair of electrically conductive strips (members) be electrically insulated from an adjacent and another pair of electrically conductive strips, and wherein a vehicle traveling along said roadway travels over a first pair of electrically conductive strips and then travels over a next adjacent pair of electrically conductive strips and so forth.

b. Switching Means to Supply DC Power to a Roadway Related Pair of Electrically Conductive Contacts or Strips (DC-Network).

A source of direct current electricity (DC network) is arranged to provide DC power to the roadway related pairs of electrically conductive strips (members).

Switching means are operative to supply DC power to a pair of electrically conductive strips when a vehicle travels over that pair, said switching means being operative to turn off the supply of DC power to a pair of electrically conductive strips, when no vehicle travels over and along that pair of electrically conductive strips.

This improves the safety of the system as suggested (page 2, lines 13-17) in that switching means are operative to supply DC power to said pair of electrically conductive strips (members) only when a vehicle travels over that pair, the switching means being operative to turn off the supply of DC power to a pair of electrically conductive strips when no vehicle travels over that pair of electrically conductive strips.

Said Patent Publications further mention (page 1, lines 7-21) a prior art system for the universal use of electrically powered roadway vehicles. A system of this kind uses a succession of 20 meter long copper strips fixed onto a roadway surface. The respective 20 meter long copper strips were positioned end to end along each lane of the roadway and were electrically insulated from each other.

Alternating current electric power (AC network) was applied to each section or portion.

c. Vehicle-Related Transmitter.

When an appropriate electrically powered vehicle travels over the respective sections of copper strip, a transmitter mounted to the vehicle turns on the power supply to the section of copper strips over which the vehicle is traveling.

d. Vehicle Related Pick-Up Arms.

Electrically operated pick-up arms on the vehicle are adapted to contact the copper strips and to obtain electricity from the roadway-related copper strips.

This electricity from the copper strips is used to run a vehicle-related electric motor on board the vehicle (and also to activate vehicle accessories and, optionally, to recharge batteries in the vehicle).

The electricity supply to each copper strip is turned only on during 1.5 seconds, i.e. the time period during which the vehicle passes over that section of copper strips.

In the absence of a signal from a vehicle, the power to that section of copper strip remains off.

In order for the vehicle to be able to pick up electric power from the roadway-related conductors or strips positioned on the roadway surface, the vehicle may be provided with a pick-up arm located under the vehicle body.

The pick-up arm may comprise a flat plate hinged to the underside of the vehicle.

Two pick-up carbon brushes may be bonded to the plate, for example by an epoxy resin or adhesive.

Leads carry the power from/to each brush to the vehicle (to the motor controller and battery pack of the vehicle). (Page 7, lines 8-13)

The pick-up arm may be retracted and extended automatically.

For example, if the vehicle detects that it is traveling over a pair of electrically conductive strips (members), the pick-up arm may be automatically extended downwardly such that the brushes contact the electrically conductive strips.

In one embodiment, the electrically conductive arm is operated such, that if power is lost for more than a predetermined time period, such as from one-half to one second, the pick-up arm is automatically retracted. (Page 7, lines 14-19)

Vehicles traveling over the pairs of copper strips must be able to pick up electric power from those strips.

A large number of different designs may be used in this regard. However, one possible design is shown with reference to FIG. 2.

In FIG. 2 a vehicle 50 having wheels 52, 54 is provided with a plate 56. Plate 56 may for example be approximately 1.620 mm wide and 100 mm long.

The plate 56, as shown in FIG. 2, stretches approximately across the full width of the vehicle.

The plate 56 may be provided with one or more holes to enable air to pass there-through to reduce the amount of down force acting on the plate when the vehicle is traveling.

The plate 56 carries two electrically conductive brushes 58, 60.

A gap 62 is located between the brushes 58, 60.

As an example, each brush may be 800 mm wide and the gap may be 20 mm wide.

The gap 62 may be filled with an electrically insulating material, suitably an insulating material that is somewhat soft and can yield without breaking, should it contact an object. (Page 14, lines 7-18)

The use of a wide pick-up plate eliminates the need for a lateral traversing mechanism for the pick up arm.

It also eliminates the need for any device to detect the vehicle's lateral position in relation to the electrically conductive strips.

All a driver has to do to achieve initial contact is to drive along the electrically conductive strips somewhere within the vehicle's track and move the pick-up arm to the down position.

Contact will be maintained so long as the electrically conductive strips remain within the vehicle track.

Automatic steering may be used to assist in this regard on a longer drive. (Page 14, lines 27-30, page 15, lines 1-2)

The brushes 58, 60 must be able to be lowered onto the strips or retracted against the underside of the vehicle.

To this end, the brushes are mounted on a pair of pantograph arms 64, 66.

The pantograph arms keep the plate 56 (and therefore the brushes 58, 60) horizontal.

Appropriate electrical connections may be provided to enable the electrical power picked up from each of the brushes 58, 60 to be transferred to the vehicle.

The pantograph arms may carry appropriate electrical cables to transfer electric power from the brushes to the vehicle. (Page 15, lines 4-10)

e. DC Voltage Difference Between Roadway Related Conductors, Contacts or Strips.

It is further suggested (Page 2, lines 18-22) that preferably a DC power with its voltage exposes a difference between each conductor or strip in a pair of conductors and that said voltage does not exceed 600 volts. More preferably, the DC power and its voltage difference between each conductor in a pair of conductors or strips do not exceed about 450 volts. Suitably, each conductor is at a voltage relevant to ground that does not exceed plus or minus 250 volts, more preferably not exceeding plus or minus 225 volts.

f. Orientation of the Roadway Related Conductive Strips.

The electrically conductive strips may be positioned on the roadway surface such that they are insulated from each other and from ground (the road surface). Suitably, the electrically conductive strips are laid onto an adhesive insulating base, which insulates them from each other.

The electrically conductive strips may be bonded to the roadway surface by an epoxy adhesive. Alternatively, the electrically conductive strips may be bonded to tiles that are then placed in or on the roadway surface.

g. Power Supply System.

The power supply system comprises a series of separate, electrically insulated but electrically conductive strips.

Each pair of strips represents a power supply section.

Each pair of strips may be provided with a dedicated source of DC power.

Alternatively, a source of DC power may provide direct current electricity to two or more pairs of strips.

h. Detector Means of Arrangement.

The switching means is suitably operatively associated with a detector means for detecting the presence of a vehicle, either about to move on to a pair of conductors or strips or on a pair of conductors.

For example, the coded signal may comprise an oscillating voltage similar to that used by utility companies for control purposes.

Such a control signal may have a frequency in the order of 400 kHz and a voltage of about 4 to 20 volts.

It will be understood that the coded signal may utilize different frequencies and different voltages from those given above. (Page 4, lines 19-29)

When one roadway section of conductors or strips is turned on, a control signal may be sent to the power supply for the next section of conductors along the path of travel of the vehicle.

This control signal, sent to the power source for the next section of conductors or strips, is used to turn on the power supply to the next section of conductors, either shortly before or just as the vehicle arrives at the next section of conductors.

Alternatively, the control signal sent to the next section of conductors or strips may turn on the power supply to that next section of conductors at a predetermined time after the power supply to the first set of conductors or strips is activated.

In order to detect the arrival or imminent arrival of a vehicle in a section of copper strips, the vehicle may be provided with a coded signal that becomes superimposed on the strips when the vehicle travels over a section or portion of the copper strips and the brushes on the vehicle are in contact with the strips.

The coded signal is received by a detector associated with a corresponding transformer station.

The detector actuates the switching of power up to that particular section of the strips.

i. Power Supply to an Adjacent Pair of Conductive Strips.

The power supply to the next set of conductor means or strips is maintained, provided that the next set of conductors or strips detects that the vehicle enters the next set of conductors or strips within a specified time period after the power supply to the next set of conductors or strips has been turned on.

In this way, if the vehicle turns off the roadway and therefore does not enter the next set of conductors or strips, the next set of conductors or strips will not detect the presence of the vehicle and therefore will shut off the power supply shortly after it has been turned on.

In this embodiment, the adjacent sections of conductors "talk" to each other and interact with each other to turn on the power supply to each roadway section with its strips either just before or just as a vehicle arrives at each section.

j. Sensor Arrangement.

A sensor arrangement may be located towards the "downstream" end of each pair of strips.

The sensor arrangement may, for example, be a current flow sensor, positioned below or adjacent to one of the electrically conductive strips.

When a vehicle is near the end of a roadway section (of electrically conductive strips), the sensor will sense the resultant current flow and then send a signal to the next section of electrically conductive strips to turn on the electricity supply to the next section in "anticipation" of the imminent arrival.

This signal may be sent via cable. The "anticipatory" signal is valid for a short time only, say 2 seconds, and if a vehicle has not arrived at the next section within that time, the next section is turned off.

k. Conditions for Activating Switching Means.

The switching means may be arranged such that the signal, that is used to turn on the next pair of conductive strips, must be larger than a predetermined minimum value in order to activate the switching means and turn on the next pair of conductive strips.

In this manner, if the next pair of conductive strips is subject to conditions of high electrical leakage, the signal will be lower than the minimum required to turn on the next pair of strips.

This is effective to minimize excessive electrical leakage which could lead to unacceptable power wastage and/or damage to the transformer/rectifier. (Page 4, lines 28-29, page 5, lines 1-4).

The use of a coded signal also allows for the possibility of enhanced operation and safety by incorporating an electricity leakage test into the apparatus.

In these instances, an electrical leakage detection means may be provided to prevent the next section of conductors or strips from turning on.

Detection of electrical leakage may occur by requiring the coded signal superimposed on each section of conductors or strips to exceed a predetermined activation threshold value before the next section of conductors or strips will be turned on.

In this fashion, superimposing the coded signal onto the conductors or strips will result in the coded signal representing the criteria not exceeding the predetermined threshold value if conditions of high electric leakage are present. Thus, the next section of conductors or strips will not be turned on in such situations. (Page 8, lines 15-28)

l. Battery Arrangements.

The vehicle may be provided with one or more batteries to store electric power or energy.

The batteries may be charged using electricity received from the roadway related electrically conductive strips.

In some embodiments, the DC voltage of the electrically conductive strips is such that it is equal to the normal charging voltage of each battery pack in the vehicle.

This allows for the vehicle motor to have an essentially seamless transition to and from battery and on-road conductors or strips, whenever there is a break and then a resumption of the on-road conductors or strips. (Page 6, lines 29-30, page 7, lines 1-5).

m. On-Board Charging Engine.

The vehicle may alternatively or additionally be provided with one or more of an on-board charging engine or a regenerative braking system to allow for recharging of the batteries. (Page 7, lines 6-7)

n. Overload Cut-Out and Re-Close Switch.

Each transformer may have an overload cut-out and re-close switch.

This switch suitably operates on the DC side of the transformer and a rectifier.

Each DC output line from the transformer and rectifiers may have independent overload switches.

The overload cut-out and re-close switches may be set such that if three re-close attempts are unsuccessfully made, the section is shut down and a signal is automatically sent to the control panel to indicate a fault.

Vehicles may then proceed across this dead section using an on-board battery power system. (Page 12, lines 10-16)

o. Safe Conditions of Bare Electric Roadway Related Electric Conductors or Strips.

A question may be raised as to whether bare electric conductors or strips onto a road surface can be safe? In the system here proposed, they are safe.

In particular, the present invention uses mains power but delivers DC voltage at relatively low volts.

Moreover, each copper conductor or strip is insulated from the roadway surface and from the other copper conductor or strip in its respective pair.

Thus, standing on one of the conductors or strips will not complete any circuit and therefore little or no current will flow through a person standing on one of the copper conductors or strips.

Further, the DC voltage supply to the conductors or strips is created by transforming and rectifying high voltage, three-phase (alternating current) AC power, to give a positive DC power to one conductor or strip and an equal negative DC power to the other conductor or strip in each pair of conductors or strips. (Page 12, lines 19-20)

p. Use of DC Voltage or AC Voltage to Supply Power to the Roadway Related Electric Conductors or Strips.

The use of DC voltage rather than AC voltage contributes to the electrical safety of the system.

The actual DC voltage that is supplied to the pairs of copper conductors or strips will depend upon several factors.

For example, the lower the standard DC voltage selected, the lower will be the perceived electrical safety risk, the lower will be the actual energy leakage, when a roadway is wet and the conductors or strips are on and the fewer the number of battery cells in each vehicle to provide an on-board power supply.

On the other hand, the weight of copper conductors or strips and/or the number of transformers needed for the on-road installation is inversely proportional to the square of the standard voltage.

That is to say, other things being equal, if the voltage is halved, the weight and cost of copper material needed will rise fourfold.

It has been found that possible standard voltages may lie anywhere between about 100 and 600 DC voltage. (Page 12, lines 3-12)

q. Magnetic Field Sensor.

An array of magnetic field sensors may be placed across the front and rear of the vehicle (Page 20, lines 3-9) to sense the position of the conductive strips.

r. Snow Ploughs and Blower Arrangements.

The use of snow ploughs and blower arrangements is also suggested. (Page 21, lines 28-30.)

s. Electrical Heating Tape.

It is also suggested the use of an electrical heating tape beside each conductor or strip to aid the clean removal of snow and ice in winter time. (Page 22, lines 1-3.)

The present invention intends to concentrate on an arrangement for overload restriction related to a vehicle driving along a chosen stretch of the road and its roadway section and with its upwardly open tracks connecting to each other from roadway section to roadway section with two or more parallel electric conductors introduced such as to be shape with uninsulated surface section in each roadway section, and the invention concerns an arrangement for avoiding overload and for offering limitation of which a third source of power, external to the vehicle is to deliver to the one or more vehicles belonging to the system while driving along different roadway sections.

More particularly the present invention concerns a power coordination between one or more vehicles, such as trucks, driving on one or more roadway sections along a stretch of roadway and one or more sources of power, external to the vehicle, and related to one or more such roadway sections and intends to offer an arrangement which is to be able to control the transfer of power from one power sources, external to the vehicles to one or more vehicles having mutually different requirements of additional power, so as to thereby distribute and/or limit the allotment of power to the respective vehicles so as to be able to avoid a temporary overload and/or offer a vehicle related limitation of the total load, a restriction of the load, which is to affect the individual power sources, external to the vehicles or peripheral to the vehicles, and be considerate of the evaluated time periods for the requirement of power of a vehicle, where it travels along a section of the roadway.

DISCLOSURE OF THE PRESENT INVENTION

Technical Problem

If the circumstance is considered, that the technical considerations that a person skilled in the relevant technical art will have to carry out in order to offer a solution of one or more posed technical problems are on the one hand initially a necessary insight into the measures and/or the sequence of measures which are to be performed and on the other hand a necessary choice of the one or several means which are required, the following technical problems must be considered to be relevant in consequence hereof in producing the present subject of invention.

Considering the earlier standpoint of technology, as it has been described above, it should therefore be seen as a technical problem to be able to understand the significance of, the advantages related to and/or the technical measures and considerations which will be necessary for conveying an electrical, and by i.a. one or more batteries in a set of batteries, conveyable vehicle along a stretch of a roadway and its roadway portions adapted system, which is to comprise; "a" a plurality of road sections or portions for subdividing the stretch of the roadway, wherein each one of these roadway portions is allotted one or more elongated tracks or slits having introduced therein current supplyable and under voltage placeable electrically conductive conductors or strips, connectable over a switch to one or more power sources as stationary electric stations, serving as an external source of power (designated as a third source of power in the following) of the vehicle so as to thereby i.a. charge said set of batteries associated with the vehicle, which set is to be able to propel the vehicle directly along the roadway sections, and "b" one or more vehicles, propellable over an individual electric motor or motors, and wherein the respective vehicle exhibits a control circuit, controlling the necessary power for creating necessary power and/or speed control, indicating the possibility of utilizing equal or different lengths of parallel electric conductors or strips, which may be subjected to electric power or voltages, related to mutually electrically insulated road sections so as to therein offer a possibility of choosing the lengths of the conductors and road sections in response to established requirements of a "continuous" supply of energy to the vehicle and its set of batteries and wherein the lengths of the respective roadway section to advantage can be chosen considerably longer than the total length of the vehicle, with the given power of the third source of power to one or more roadway sections being the subject of limiting an overload.

There is a technical problem or a technical consideration in being able to understand the significance of, the advantages related to and/or the technical measures and considerations which will be required for connecting to said source of power, external to the vehicle, a limited circuit to a chosen maximized power outlet, with this circuit being adapted to supply power over said switch to said conductors in its roadway section while the vehicle or vehicles are passing.

There is a technical problem in being able to understand the significance of, the advantages related to and/or the technical measures and considerations which will be required for letting said vehicle, over a transmitter allotted to the vehicle, be adapted to transfer to an electric station of a front-lying roadway section or external power source and its receiver supplementing information corresponding to the power of the vehicle and/or its need of power, while the vehicle passes a roadway section lying in front thereof.

There is a technical problem in being able to understand the significance of, the advantages related to and/or the technical measures and considerations which will be required for letting the transmitter, allotted to the electric station, be adapted to transfer to a receiver, allotted to a vehicle, informatory information corresponding to the supply of allotted power and/or energy which will be available while the vehicle passes over the roadway section and/or roadway sections lying in front of it.

There is a technical problem in being able to understand the significance of, the advantages related to and/or the technical measures and considerations which will be required for letting a plurality of electric stations, external to the vehicle be coordinated to one and the same controlling supply station and when a vehicle over its allotted transmitter sends information to the receiver of the station the station will allot a supply of power and/or energy solely in response to information received from a superior supply station.

There is a technical problem in being able to understand the significance of, the advantages related to and/or the technical measures and considerations which will be required for distributing, from the superior supply station with electric stations and allotted roadway sections related thereto, the total available power and/or energy supply between relevant stations and roadway sections and associated vehicles.

There is a technical problem in being able to understand the significance of, the advantages related to and/or the technical measures and considerations which will be required for letting said vehicle, over a transmitter allotted to the vehicle, be adapted to transfer to the electric station of a roadway section in front and its receiver explanatory information corresponding to the requirement of power and/or energy of the vehicle while the vehicle passes over a chosen plurality of roadway sections in front thereof, with the superior supply station being able to receive said information, such as through a power station, with the superior supply station being adapted to feed out over relevant power stations information which unanimously determines its allotted power and/or energy supply during the time sectors, when said vehicle passes the road sections allotted to the station.

There is a technical problem in a vehicle which on its underneath side is provided with a displaceable contact means as a current collector, which may be moved upwards and downwards as well as sideways, counting across the direction of transportation of the vehicle, with elongated tracks or gaps, via roadway section after road way section, to support, under the roadway of the roadway sections, conductors, which may be supplied with current and provided with voltage, such as rails, with said contact means coordinated with vehicle related control equipment for creating an adaptation of the contact means so that it at least offers mechanical and electrical contact to said conductors so as to illustrate the significance of, the advantages related to and the technical measures and considerations which will be required for creating coordination between the at least two conductors, which may be subjected to voltage, and the contact means of the vehicle over coordinated sliding or rolling contacts, such as contact springs, for electric cooperation with the respective ones of the conductors or rails, which may be subjected to voltage, and with a roadway section supporting the vehicle and charging a set of batteries over its conductors and its external electric source of power from coupling means or its allotted switch, whereas a roadway section in front with its at least two electric conductors successively is to control such as regards its intact roadway sections and thereafter provide its AC or DC feed voltage from its external electric source of power and over its allotted switching means or switch solely during the time sectors under which the vehicle passes such a roadway section lying in front thereof.

There is a technical problem in being able to understand the significance of, the advantages related to and/or the technical measures and considerations which will be required for letting switching means or a switch be related to each or solely to chosen roadway sections and its electric conductor where such coupling means is to be related to a roadway section lying in front with its conductors still not subjected to voltage, wherein this switching means is to be adapted over a supervisory circuit initiating a "go"-signal after sensing an electrically intact roadway section before the switching means or switch is activated for supplying a feed voltage to its conductors.

There is a technical problem in being able to understand the significance of, the advantages related to and/or the technical measures and considerations which will be required for letting such supervisory circuit be adapted to be become initiated by a remote controlled signal (radio signal) from the vehicle for on the one hand checking that the roadway section with its conductors lying in front is intact and on the other hand to register an identity allotted to the vehicle and also to activate the switching means or switch for supplying a feed voltage to its conductors.

There is a technical problem in being able to understand the significance of, the advantages related to and/or the technical measures and considerations which will be required for letting a single contact means with at least two contact means for one of the conductors be allotted to the front portion of vehicle.

There is a technical problem in being able to understand the significance of, the advantages related to and/or the technical measures and considerations which will be required for letting one or more electric stations belonging to the roadway section, for one or more roadway sections, be activated solely in such time sectors when a switching means or switch allotted to the station senses the presence of a vehicle allotted to the system by means of a sensor.

There is a technical problem in being able to understand the significance of, the advantages related to and/or the technical measures and considerations which will be required for adapting a DC or an AC supply voltage to said conductors, which may be supplied with current and voltage, and/or a DC feed voltage from the first vehicle related supply source to the supply transfer which is required for power feeding, over the battery, of the electrically powered motor with an instantaneous high load.

The Solution

As its starting point this invention utilizes the known technology indicated by way of introduction and is based on an arrangement for overload restriction, said arrangement is intended to be used in a vehicle-related system for adapting in an electrically, i.a. by one or more batteries or a set of batteries, conveyable vehicle being driven along a stretch of a roadway and its associated roadway sections or portions. This system may comprise; "a" a plurality of roadway sections or portions subdividing the extension or stretch of the roadway, wherein each one of these road sections or portions is allotted one or more elongated tracks, grooves or slots, having introduced therein conductor bare surfaces such as conductors or strips, which may be supplied with power of current and which may be placed under voltage by means of a switch to one or more power sources external to the vehicle, such as electric stations, so as to thereby be able to charge said set of batteries allotted to the vehicle, but primarily over said set of batteries driving the vehicle along the extension of the roadway and its roadway portions, and "b" one or more vehicles which may be driven by an electric motor or motors and wherein the respective vehicles exhibit a power control circuit for required power adapted for creating a required power and/or speed control, wherein said vehicle on its underneath side is provided with an up and down and sideways, respectively, counted crosswise to the direction of transportation of the vehicle, displaceable contact means and in which said elongated tracks, grooves or slots extend along the roadway of the road sections or portions, said contact means being coordinated with vehicle related control equipment or an arrangement for creating an adaptation of the contact means at least to offer mechanical and electrical contact to said conductor or strip, wherein coordination between the voltage-carrying conductors allotted to the roadway sections or portions and the contact means of the vehicle occurs over coordinated current collectors or removers, such as in the form of contact springs, adapted for mechanical and electrical cooperation with respective ones of the voltage-carrying conductors or strips.

This invention has the purpose of indicating a further development of the arrangement mentioned above in the system mentioned above and having the known technology supplemented with the characteristics which are mentioned in the characterizing portion of claim 1.

Proposed embodiments falling within the frame of the basic idea of the present invention are exposing the characteristics disclosed by the sub claims.

Advantages

The advantages which primarily must be considered to be characterizing of the present invention and the thereby indicated specific significant characteristics are that thereby prerequisites have been created for in a vehicle-related arrangement according to the preamble of claim 1 indicating that the vehicle is to be able to be driven by and/or be offered supplementary charging of the batteries related to the vehicle from primarily an electric source of energy external to the vehicle and indicating utilization of a circuit limited to a chosen maximized and/or controlled outlet of power with its vehicle-related contact means being adapted to comprise an elongated arm, one end portion of which is rotatably attached to the underneath side of the vehicle and the other end portion of which is adapted to support said contact means.

More particularly the invention refers to coordination between one or more vehicles, such as trucks, which drive along one or more road sections in a stretch of the roadway, and one or more power sources external to the vehicles and related to one or more such roadway sections, in addition whereto it offers an arrangement which will be able to control the supply of power from one or more power sources external to the vehicles to one or more vehicles having mutually different requirements of addition of power so as to thereby distribute and/or limit the supply of power to the respective vehicles so as to thereby be able to avoid a temporary overload and/or to offer a limitation of the load, wherein such limitation is to load the individual power sources external to the vehicles or peripheral to the vehicles and the consideration of remaining time sectors for the requirement of power of a vehicle while it drives along a road section.

The primary subject matter of a control unit and a charging system related to a vehicle in accordance with the present invention is disclosed in the characterizing portion of the following patent claim 1.

SHORT DESCRIPTION OF THE DRAWINGS

Figure 1B:
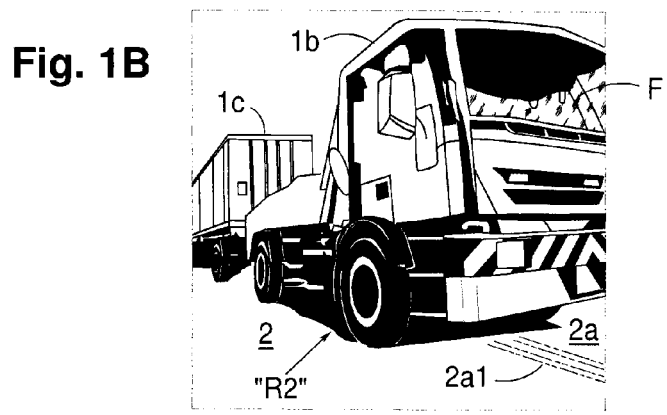
Figure 1C:
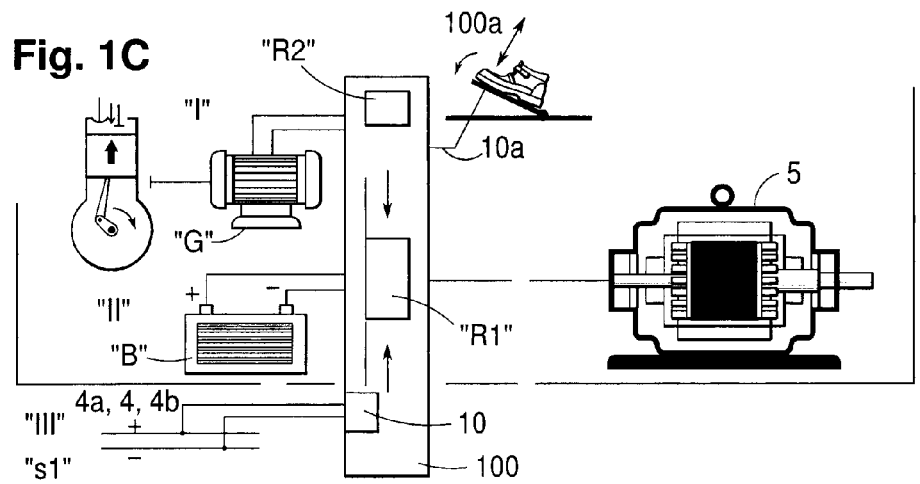
Figure 1D:
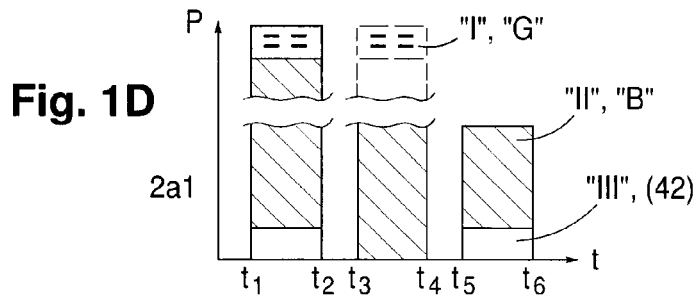
Figure 4:
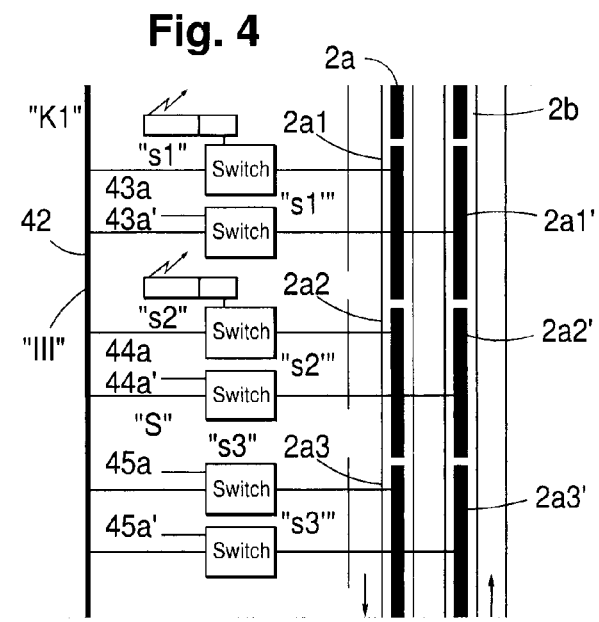
Figure 5:
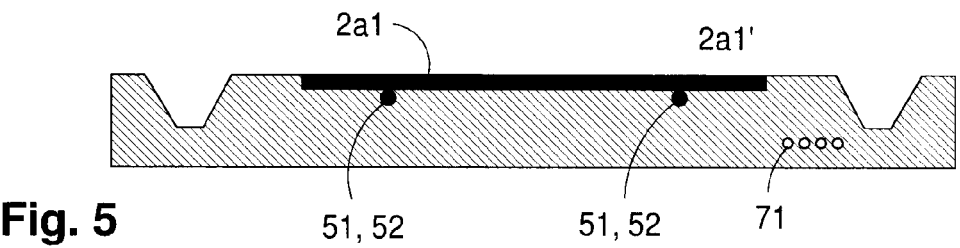
Figure 5A:
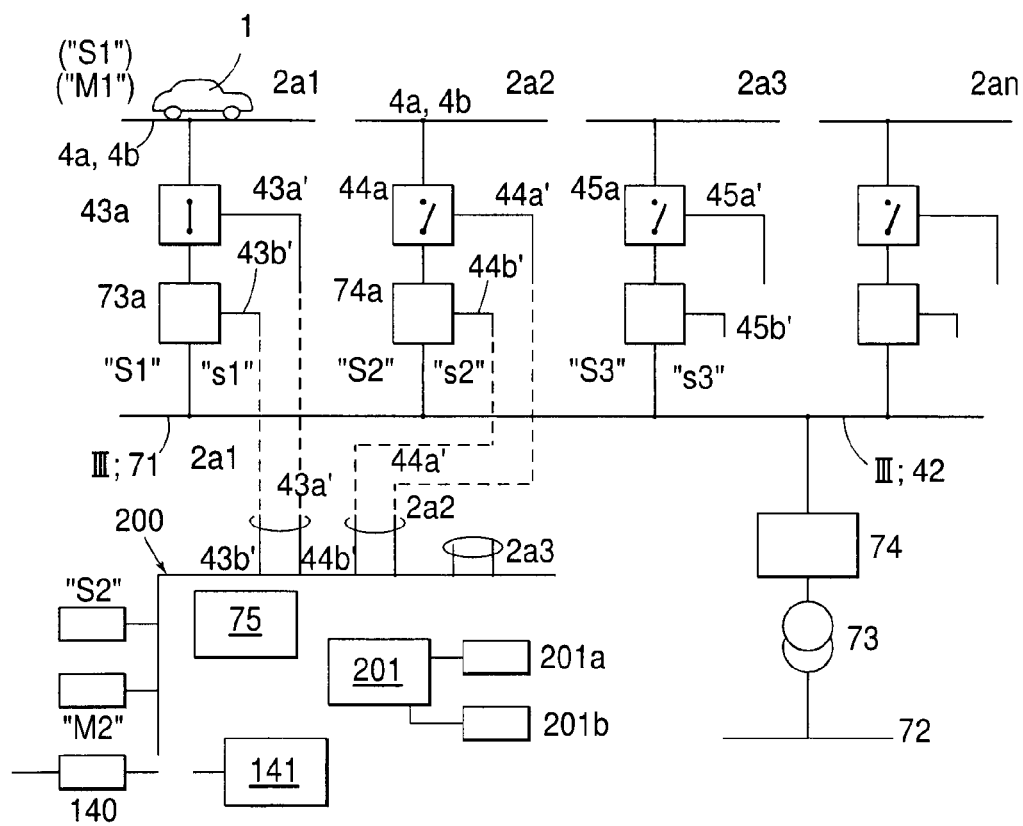
Figure 6:
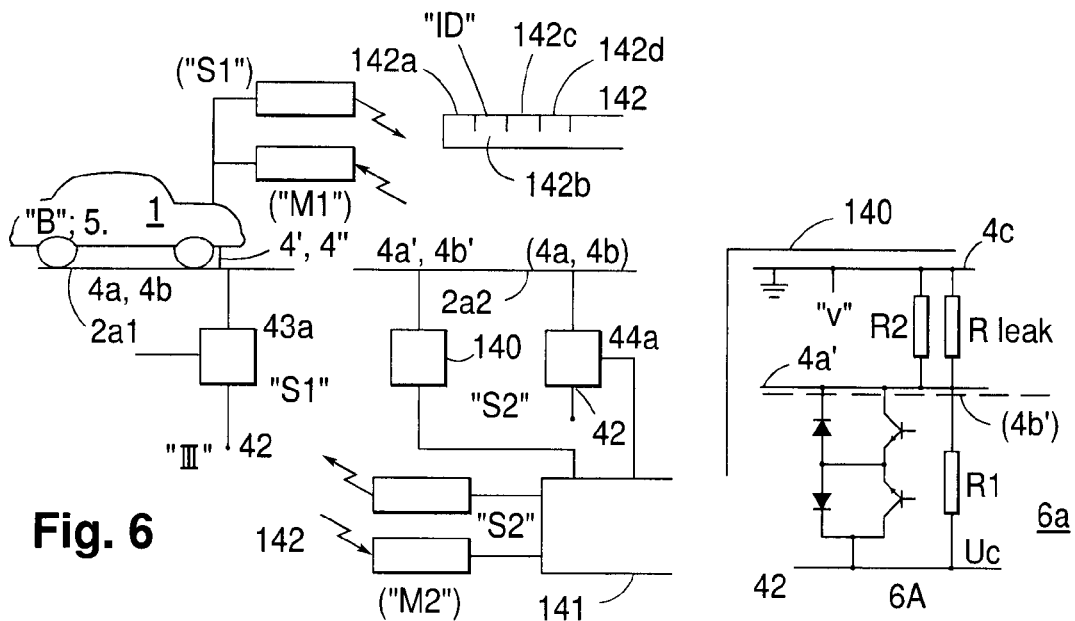
Figure 7:
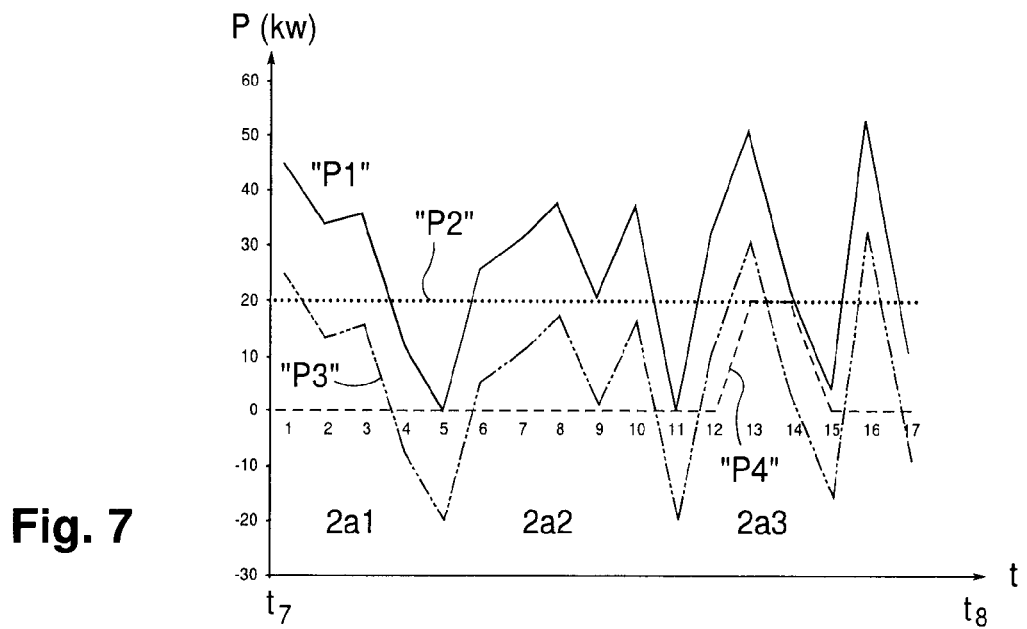

Prior art and presently proposed embodiments, exhibiting the significant characteristics related to the present invention, will now, as an example, be described more specifically with reference to the accompanying drawings in which;

FIG. 1A shows a perspective view of a vehicle, illustrated as a Ford Model A, converted to being battery powered and having an electrically powered engine or motor, a control circuit controlling the power for speed control and adaptation to an instantaneously acting load and necessary power as well as a control arrangement or control equipment intended for use in driving and steering the vehicle, FIG. 1B shows a perspective view of a truck with a trailer and with a control circuit controlling the power in accordance with the basic principles of FIG. 1A, FIG. 1C shows in an overview that two vehicle-related power sources, a first one ("I"), a diesel generator, a second one ("II"), a battery or a battery set, and a third one ("III"), an external source of power to the vehicle, feeding electric power to parallel conductor surfaces, such as rails or strips, which may be subjected to power or voltage and which surfaces are arranged in continuous grooves in a roadway and coordinated to a vehicle-related control circuit, which in response to a necessary supplied power to an electric motor makes possible the selection of all or a combination of the power-feeding sources of energy, wherein the power control is illustrated here as a throttle having its motion related to a control circuit "R2", FIG. 1D illustrates a P/t-diagram (power/time) wherein full power or reduced power is to be transferred over the control circuit to the vehicle, to pass along a roadway, its road sections or portions and its conductors or strips, FIG. 2 basically shows an electric arrangement related to a vehicle having control equipment for controlling a current collector or commutator arranged against electric contact surfaces, with paired conductors shaped as rails or strips for enabling parallel operation of an electric vehicle-related motor from one or both of the two power sources (first and second ones) related to the vehicle and/or from a stationary (third) source of power related externally to the vehicle or the peripheral (third) source of power, FIG. 3 shows an end view of a vehicle with its downwardly directed contact means or current collectors in the form of sliding contacts, in cooperation with two individual contact surfaces, such as conductors, strips or rails, allotted to the road section or portion and being under power or tension, FIG. 4 shows an example of an electric arrangement in which a number of road sections or portions are provided with parallel contact surfaces as conductors or strips under power or tension, each one being connectable over a switch to its vehicle external or peripheral electric station and in which roadway section or portion after roadway section or portion may be activated and are placed under power of voltage by activating a coupling means or a switch over a control unit as said vehicle passes roadway section after roadway section, FIG. 5 illustrates a roadway sector in a section with side-related cabling illustrated at the right, and in FIG. 5a an example of how solely short roadway sections will be able to be activated by an AC or DC feed voltage when a vehicle passes over them and with an arrangement in accordance with the indications of the present invention, FIG. 6 illustrates an embodiment of the invention with first vehicle-related transmitting and receiving circuits for a wireless transfer of information to other transmitter/receiver-circuits related to a road section in front as well as a switching diagram having an "IGBT"-switch serving within and as a supervisory circuit, with a practical embodiment of the present invention being illustrated additionally, and FIG. 7 shows a diagram of power/time similar to FIG. 1D and illustrates the momentary withdrawal of power while the vehicle passes road section after road section.

DESCRIPTION OF THE PRESENTLY PROPOSED EMBODIMENTS

By way of introduction it shall be mentioned that in the following description of presently proposed embodiments exhibiting the significant characteristics related to the invention and being clarified by the figures, illustrated in the accompanying drawings, we have chosen terms and specific terminology with the purpose of thereby primarily clarifying the concept of the actual invention.

However, in this connection it should be noted that the terms chosen here shall not be seen as limiting solely to the terms utilized and chosen here and it should be understood that each such chosen term is to be construed such that it in addition will be able to include all technical equivalents which operate in the same manner or essentially the same manner so as thereby to be able to achieve the same or essentially the same purpose and/or the same technical result.

Thus, with reference to the accompanying drawings the basic prerequisites of the present invention are shown schematically and in detail, with the significant characteristics related to the invention being concretized in consequence of the now proposed and in the following more specifically described embodiments.

Thus, FIG. 1A shows a system "S" adapted for driving an electrically, and by one or more batteries or a set of batteries, propellable vehicle 1 along a stretch of a roadway 2 and its roadway sections or portions 2a1 and 2a1'. (FIG. 4)

Exteriorly the vehicle 1 consists of a Ford Model A, but this is converted to a battery powered vehicle having continuous access to an external third source of power or energy which here is designated "III" and "s1" for a stationary station.

The vehicle 1 according to the invention is also to comprise a not shown steering arrangement 3 or steering equipment so that a driver "F" (not shown) can drive and steer the vehicle 1 along said stretch of roadway 2 and its road section or portion 2a1.

Vehicle 1 would also be able to include a gear box and other parts and components which are required for advancing the vehicle, but as these parts are well-known to a person skilled in the art they will not be described in detail.

However, an electrically driven vehicle 1 does not need a gear box as speed control and adapted power can occur over known electric and electronic circuits.

In the same manner as FIG. 1A, FIG. 1B shows an electrically propellable truck 1b with a connected trailer 1c along the stretch of roadway 2, 2a and its associated roadway section or portion 2a1.

FIG. 1C clearly shows two vehicle-related and vehicle-associated sources of power, which here are designated "I" and "II", a "first" one in the form of a diesel generator "G", a "second" one in the form of a battery or a set of batteries "B", and a "third" one in the form of a source of power, positioned externally of the vehicle 1, here taking the form of parallel conductive surfaces, such as conductors, rails or strips, which may be subjected to power or voltage over switching means or switches, and introduced into tracks, grooves and/or a cavity along each roadway section or portion along the entire stretch of the road 2.

In FIG. 1C the three sources of power are coordinated to a vehicle-related power control circuit 100, which in response to a power supplied to an electric driving motor 5 chooses all or a combination of the three power feeding energy sources "I", "II" and "III", respectively. Here the power control is illustrated as a throttle 100a, the movement of which upwards and downwards is connected to a control circuit "R2" in power control circuit 100, which in turn is related to a circuit "R1" distributing power and energy between the three power sources.

In a P/t (power/time) diagram FIG. 1D illustrates how full power or reduced power can be distributed and transferred for passage of the vehicle 1, 1b along different roadway sections or portions 2a1 of a roadway or stretch of a roadway 2 with the help of said circuit "R1" and control circuit "R2" and the power control circuit "100".

Between moments $t_1$-$t_2$ it is basically illustrated how a complete removal of power from the three power sources "I", "II" and "III", respectively, can be carried out, with the power taken out from the power source "I", illustrated at the top, the power taken out from power source "II", illustrated there below, and the power taken out from power source "III", illustrated at the bottom.

Reduced removal of power from power sources "I" and "II" is basically illustrated between the points of time $t_3$-$t_4$, whereas power source "III" is shown disconnected in this case.

Reduced removal of power from power sources "II" and "III" is illustrated basically between the points of time $t_5$-$t_6$.

During this time period $t_5$-$t_6$ full power can be achieved from power source "II", and a small surplus can be permitted to be fed to the motor 5 and trickle charge the battery set "II", "B".

The invention is based on that the set of batteries "B" and the second power source "II" but particularly the third power source "III" primarily shall, over the distributing circuit "R1", supply motor 5 with power, and for this purpose the set of batteries "II", "B" will have to have stored power and apart from this will have to be dimensioned so as to drive motor 5 at full power.

The set of batteries "II", "B" is primarily to be trickle charged via power source "III", "s1" and secondarily to be trickle charged or charged over power source "I", "G".

The power or energy from power sources "I" and "III" can be chosen to be 5-30% of the power or energy associated with power source "II", "B", such as around 25%.

The supply power or voltage to motor 5 can be chosen to +400 VDC and −400 VDC, i.e. the voltage value of 800 VDC is to be fed to the motor 5.

System "S" in FIG. 1A is then primarily to comprise "a" one or more over an individual electric motor 5 or motors electrically powerable vehicles 1, 1b, with the respective vehicle exhibiting a power distributing and/or controlling control circuit "R1" within said power control circuit 100 and for creating a necessary power and/or a speed control, via a control circuit "R2" and a throttle arrangement 100a.

The necessary output power is to be supplied primarily by the vehicle-internal power source of energy "II", "B", which secondarily is to be placed under trickle charging from the third power source of energy "III", "s1".

The stretch of a roadway 2 is in FIG. 4 shown divisible into road sections or portions 2a (2a1, 2a2, 2a3); 2b (2a1', 2a2' and 2a3'), wherein each one to advantage can be allotted to an external power source "III", which here is illustrated as a number of electric stations "s1", "s2", "s3"; "s1'", "s2'", "s3'".

Of the third power source "III", "s1", external to the vehicle 1 and/or the first power source "I", "G", associated with the vehicle, one or both can thereby be utilized for supplementary charging the set of batteries "II", "B" of the vehicle 1 during an adapted time sequence of power removal from this set of batteries.

Within the scope of the invention there is also the possibility of in addition to driving the vehicle 1 via the set of batteries "II", "B" and in supplementary charging the set of batteries "II", "B" along the road sections or portions and the stationary electric station "s1" or any of the third power source of energy "III", any additional necessary power and energy for driving the vehicle 1 over a road section or portion 2a1 can be supplied via power source "I", "G" associated with the vehicle.

FIG. 2 basically shows an electrical/mechanical switching arrangement "K" related to a vehicle 1, (1b) in a schematically illustrated vehicle-related arrangement in the form of control equipment 10 for controlling a contact member or a current remover or collector 4, associated with the vehicle 1, and to an electric contact with pairs of contact surfaces, as leads or strips, which may be placed under power or voltage and in the form of rails or strips 4a, 4b for the possible common driving in parallel of an electric motor 5 from the set of batteries "II", "B" and/or from the stationary station "III", "s1" and/or from the diesel generator "I", "G".

In this case current remover or collector 4 is related to a support 6 which may be displaced upwards and downwards vertically by means of a first electric auxiliary motor 7 and may be moved sideways back and forth by a second electric auxiliary motor 8.

The means and the control of auxiliary motors 7, 8, which are required for this movement with the assistance of sensors, are not shown in detail.

Both auxiliary motor 7 and auxiliary motor 8 may be activated in a movement directed forward and backward, wherein a first motion is activated over a first signal on a first conductor 7a and a first signal over a first conductor 8a, respectively, whereas a second (opposite) motion is activated by means of a second signal over conductors 7a and 8a, respectively, while the instantaneous setting positions of motors 7, 8 and support 6 are evaluated by one or more, not shown, sensors and are indicated by means of a generated signal on a second conductor or lead 7b and 8b, respectively.

These signals on the first conductors 7a, 8a are generated in a central unit or a power control circuit 100 having a control equipment 10, and signals on the second conductor 7b and 8b are generated in the same central circuit 100, while utilizing position sensors (not shown).

Said power control circuit 100 with control equipment 10 is a complex unit, which i.a. over a sensor 16 is to be able to sense the existence of and the orientation of conductor surfaces, as conductors or strips 4a, 4b, and thereafter lower the current remover or collector 4 by means of auxiliary motor 7 to electric contact with these two conductors 4a, 4b, which here are illustrated as being placed under voltage.

Over a connection 10a to power control circuit 100 and its control circuit "R2" the power and energy which over circuit "R1" distributes the energy sources is supplied to motor 5, and is here controlled by throttle arrangement 100a. For this purpose circuit "R2" will have to be controlled directly by said throttle arrangement 100a (FIG. 1C) so as to supply motor 5 with a required power over circuit "R1".

In the illustrated position the current collector or remover 4 conducts current and voltage from power source "s1", "III" over to the power and energy distributing circuit "R1". The latter or a control circuit "R2" senses the power requirement of motor 5 over its central unit 100 and primarily feeds motor 5 with the power it needs, according to the input signal on the connection or conductor 10a, and generated output signal on the connection or conductor 10b so as thereby to load the stationary system "III", "s1" and supplement the power and energy requirements over battery setting "II", "B".

Connecting in parallel the power "III", "s1" taken out of the vehicle externally and the power "I", "G" and/or "II", "B" generated in the vehicle can here be carried out over circuits "R1" and control circuit "R2" and with the assistance of power control circuit 100.

Information about a desired speed and thereto related power of vehicle 1 is supplied to power central circuit 100 over conductor 10a, and circuit "R1" is affected over conductor 10b via internal circuits, which are not shown, and the function of the control circuit "R2" and control equipment 10.

FIG. 3 shows an end view of a vehicle 1, (1b) with its downwardly directed current collector or remover 4 in mechanical and electrical cooperation with the two live contact surfaces, as conductors, rails or strips 4a, 4b associated with road portion 2a1' and a connection 4c to ground.

FIG. 4 shows an electric switching arrangement "K1", in which roadway section or portion after roadway section or portion 2a1, 2a2, 2a3 and 2a1', 2a2' and 2a3', respectively, with their station or stations "s1", "s2", "s3" and "s1'", s2'" and "s3'", respectively, can be activated and made to conduct power as voltage from one and the same controlled power source "III", 42 over switching means and switches 43a, 44a, and 45a for one stretch of a roadway 2a and 43a', 44a' and 45a' along the opposite stretch of a roadway 2b, depending on whether a vehicle 1, 1b will pass along the electrically separate but with longitudinal tracks or grooves coordinated roadway 2a, 2b sections or portions.

For this a number of switches or connecting means for connecting and disconnecting stations "s1", "s2" . . . will be needed, wherein this connecting and disconnecting can occur over stationary sensors (not shown) related to the section or portion of the roadway.

The present invention is based on the prerequisites mentioned above, and FIG. 5 illustrates a roadway section 2a1 coordinated with an adjacent road section 2a1' and FIG. 5A shows an example of how solely short road sections 2a1, 2a2, 2a3 and 2a n, respectively, will be able to be activated while a vehicle 1 passes the latter and utilizing a DC low voltage cable 71 and an AC high voltage cable 72 with associated transformer 73 and rectifier bridge 74. Each roadway section with its two conductors 4a, 4b which convey DC voltage cooperate with their switch or switching means 43a, 44a, and 45a, respectively.

FIG. 5a illustrates the present invention more in detail.

Thus, the present invention indicates that to said power source "III"; "42" and "71" external to the vehicle there is to be connected a chosen power outlet, such as a circuit 73a limiting a maximized outlet of power.

Circuit 73a and corresponding circuits of roadway sectors 2a2, 2a3, 2an can limit the outlet of power by being connected in short periods during the time sectors when the vehicle 1 passes the road section. The limitation can also comprise information to the driver to limit the outlet of power himself in known manner or disconnect totally.

This circuit 73a is thus adapted to supply, over said switch 43a, power to said conductors 4a, 4b in their roadway section 2a1 while the vehicle 1 passes.

The electric station ("S1") allotted to transmitter "S1" is adapted to transfer informatory information to a receiver M1 allotted to a vehicle, said information corresponding to an allotted power and/or energy supply while the vehicle 1 passes over the road section 2a2 lying in front.

A plurality of electric stations "s1 . . . s3" are coordinated here to one and the same superior feed station 72, 73, 74, and when a vehicle 1 over its allotted transmitter "S1" transmits information to the receiver M2 of the station, said station will allot power and/or energy supply solely in response to information given from the superior feed station 72, 73, 74 over a calculating circuit 75.

The total power and/or energy supply between the stations and the associated vehicles is distributed over a superior feed station 72, 73, 74 with electric stations "s1 . . . s3" related thereto and allotted road sections 2a1, 2a2, 2a3.

Said vehicle 1 is adapted over a transmitter ("S1") allotted to the vehicle to transfer to the electric station "s2" of a roadway section in front of the vehicle and to its receiver "M2" informatory information corresponding to the requirement of power and/or energy of the vehicle 1 while the vehicle passes over a plurality of roadway sections 2a2, 2a3 . . . 2an lying in front of it and the superior feed station 200 receives said information, as over station "s2", with the superior feed station then being adapted to feed to relevant electric stations "s2", "s3" information which unitarily determines its allotted supply of power and/or energy during the time sector when said vehicle 1 passes the roadway sections 2a2; 2a3 belonging to the station.

The present invention takes the above shown and described embodiment as its starting point and intends to concentrate to the electric connection of individual roadway sections with its two conductors 4a, 4b over associated switches 43a, 44a in accordance with FIG. 5a.

FIG. 6 illustrates coordination between the two conductors 4a, 4b of roadway section 2a1 subjected to power and the contact means 4 of vehicle 1 where contact occurs over two coordinated current collectors, such as contact springs 4', 4", adapted for electric cooperation with respective ones of the two conductors 4a, 4b which may be subjected to voltage, and that a road section 2a1 supporting the vehicle can over its conductors 4a, 4b and its external electric source of power "III", "42" feed battery set "II"; "B" and the motor 5 of the vehicle from its associated switch 43a, whereas the roadway section 2a2 in front, with its two electric conductors 4a', 4b', is to be controlled successively with regard to its intact roadway section and not until thereafter be supplied with its DC or AC feed voltage from the external electric power source "III", "42" and from its associated switch 44a solely during the time periods when vehicle 1 will pass this road section 2a2 lying in front.

It is here illustrated that a switch or coupling means 43a, 44a is to be related to each or solely chosen road sections 2a1, 2a2 and its two electric conductors 4a, 4b, 4a', 4b', wherein a not yet activated switching means 44a is to be related to a preceding road section 2a2 with its not yet set under voltage conductor 4a', 4b', wherein this switching means 44a is to be adapted by initiating, by a supervisory circuit 140, for activation a clearance signal after confirming that roadway section 2a2 is intact before switching means 44a is activated for supplying a DC or AC feed voltage (42) to its conductors (4a, 4b).

Supervisory circuit 140 is adapted by a remote control signal from a transmitter "S1" (radio signal) from vehicle 1 on the one hand to carry out checking 140 that road section 2a2 with its conductors 4a', 4b' is intact, and on the other hand to register an identity "ID" allotted to the vehicle 1 and to activate connecting means 44a for supplying feed voltage to its conductors.

Contact means 4 has been allotted the front portion of vehicle 1.

More particularly, FIG. 6 illustrates that vehicle 1 is provided with a transmitter ("S1") and a receiver ("M1") for cooperation with a stationary receiver "M2" and transmitter "S2".

Transmitting and receiving can occur in the form of a data package 142 with an introductory package 142a activating supervisory circuit 140, a subsequent package 142b transferring the identity "ID" of the vehicle 1, an additional package 142c representing a requirement of power supply for roadway section 2a2, etc.

Supervisory circuit 140 can be structured as shown in the switching diagram illustrated in FIGS. 6 and 6A, respectively.

Supervisory circuit 140 is adapted such, that before conductors 4a', 4b' are subjected to voltage, the impedance to ground potential 4c is measured. If the impedance is too low, conductor 4a' will not be subjected to voltage. Conductor 4b' is tested in a corresponding circuit as this can indicate that the track with the conductors is filled with water or that some object results in a short circuit (sabotage or something that has fallen off another vehicle).

By introducing two resistances R1 and R2 in circuit 140 as in FIG. 6A, one for each conductor 4a' (4b'), which resistances can be equally large, conductors 4a'; (4b'), which are to be subjected to voltage, will receive a voltage which is determined by resistors R1 and R2. If they are of equal size the voltage will be half of the voltage on a low voltage cable Uc whose voltage comes from conductor 42.

If there is something wrong with semiconductor breaker 44a so that it always is "on", an applied voltage will instead be the same as low voltage Uc. This provides protection, and a breaker disconnects the voltage on the low voltage cable, which results in that the entire roadway section 2a2 not having any voltage.

If the leakage current is great, resistance $R_{leak}$ will exhibit a low value.

In order to solely place a roadway section 2a2 under voltage when a vehicle passes it is possible to utilize a distant identification system, for example RFID (radio frequency identification).

This system can then sent the identification "ID" of vehicle 1, which indicates that it is a vehicle 1 belonging to the system or an automobile and also the speed of the automobile.

If the vehicle drives very slowly or stands still there is a danger that some person can be positioned in road sector 2a2, and then it can be appropriate not to subject sector 2a2 to voltage.

If vehicle 1 states that the speed is for example 72 km per hour, i.a. 20 meter per second, and the road sector has a length of 40 meters, it can remain under power for two seconds, i.a. the time that it takes for the vehicle to pass the road section. Hereby the danger will be minimized that a person can come into contact with a conductor or rail 4a, 4b subjected to voltage.

It should particularly be noted that each road section with its two conductors is in order have the possibility of being allotted one and the same or equal polarity, feed voltage over switches allotted to the road section.

The roadway sections can be chosen with arbitrary length and are chosen completely entirely of the lengths of the vehicles.

If the present invention in accordance with FIGS. 5 and 6 now is viewed, the vehicle 1 can send an "ID" signal over data package 142b and a requirement of power feeding over data package 142c and/or over data package 142d a question of power feeding during road sector 2a2, which question is to be answered directly or indirectly by central unit 200, which is located outside of the vehicle.

The question 142d is sent from transmitter ("S1") and is received in receiver "M2" and processed in a calculating circuit 201 (75) with a memory 201a being connected to said circuit.

This memory 201a is then to store information about the momentary power load of the individual road section 2a1 and power loads calculated in time and applicable to road sections 2a2, 2a3 etc.

Depending on this calculation, central unit 200 sends to vehicle 1 over transmitter "S2" and receiver "M1" information concerning a calculated withdrawal of power along roadway section 2a2 and thereafter road section 2a3, etc. up to road section 2an.

Central unit 200 intends to keep switching means 43a in connected state over line 43a' during the time periods when vehicle 1 is positioned along roadway section 2a1.

The power output of station "S1" is controlled over line 43b'.

Central unit 200 is adapted, over a circuit arrangement not more specifically described, to retain switching means 44a, 45a in its non-connected position over line 44a', 45a' the whole time until vehicle 1 arrives at road section 2a2, 2a3.

When vehicle 1 arrives at road section 2a2 switching means 44a will be activated and the power output of station "s2" will be controlled over line 44b' in dependence of calculated information from central unit 200 and its time circuit 201b.

Central unit 200 offers a calculated measuring of power to one or more road sections where one or more vehicles are located.

With reference to FIG. 7, a diagram of power/time is shown there and is valid between time periods $t_7$ and $t_8$ when vehicle 1 is to pass road sections 2a1, 2a2, and 2a3 with different requirements of power.

Thus, the curve "P1" illustrates the distribution in time of the necessary variable power to motor 5 of vehicle 1, in kW, the curve "P2" has the purpose of illustrating the power level (in this case chosen constant at "t" from the third source of power "III", "s1", curve P3" illustrates the varying power that battery set "II" has, and "B" represents a curve "P4" with the intension of illustrating the temperable power which the first source of energy "I", "G" can generate.

The invention is of course not limited to the embodiment disclosed above as an example, and it can be subjected to modifications within the frame of the inventive concept illustrated in the following claims.

It should be particularly noted that each shown unit and/or circuit can be combined with each other illustrated unit and/or circuit within the frame of being able to reach the desired technical function.

Some of the following reference numerals have been introduced into FIGS. 1 to 4;
 a. 1. Vehicle illustrated as a Ford Model A.
 b. 1b. Truck
 c. 1c. Trailer to truck "b".
 d. 2. Stretch of a roadway
 e. 2a. Roadway in one traveling direction
 f. 2b. Roadway in an opposite traveling direction
 g. 2a1. Roadway section in one traveling direction
 h. 2a1". Roadway section in an opposite direction
 i. 3. Steering equipment
 j. 4. Vehicle related contact means as current remover
 k. 4a. Electrical conductive first rail
 l. 4b. Electrical conductive second rail
 m. 4c. Roadway section related electrical conductor
 n. 4a". Electrical conductive first surface
 o. 4b". Electrical conductive second surface
 p. 5. Vehicle related DC-motor
 q. 6. Support for vehicle related contact means (j)
 r. 7, 8. Auxiliary motors
 s. 10. Control equipment for contact means (j)
 t. 30. Canalization for electric conductors (k, l, m.) and including grooves (u, v.)
 u. 51. First roadway section related groove
 v. 52. Second roadway section related groove
 w. 100. Power control circuit
 x. "I". First vehicle related power source (Generator)
 y. "II". Second vehicle related power source (Battery set.)
 z. "III". Third power source, vehicle external (Ground Station)
 aa. "F". Driver (not shown.)
 bb. "R1". Energy distributing and three power sources controlling circuit
 cc. "R2". Control circuit for energy distribution (Speed control)
 dd. "S". Vehicle and roadways related system

The invention claimed is:

1. An arrangement for overload restriction associated with a system for propelling an electrically propellable vehicle, by one or several batteries or a set of batteries along a roadway comprising a plurality of roadway sections or portions, said system comprising:
 "a" a plurality of roadway portions for subdividing the roadway into said roadway sections, wherein each one of these roadway sections comprises one or more elongated tracks or slits having conductors introduced therein adapted to be supplied with current and put under voltage and being connectable via a switch to one or more vehicle-external power sources, including vehicle external electric stations, for thereby enabling a charging of said set of batteries belonging to the vehicle, but primarily driving the vehicle along the roadway and its roadway sections, and
 "b" one or more driveable or propellable vehicles which may be driven by means of an electric motor or motors, with each of the respective vehicles comprising a control circuit adapted for necessary distribution of power, adapted for creating a required power and/or speed control, wherein said vehicle is provided on its underneath side with contact means comprising current collectors which are displaceable up and down and sideways, in relation to the direction of transportation of the vehicle, wherein said elongated track or tracks and its conductors extend along the roadway and the roadway sections, and wherein said contact means is coordinated with a vehicle-related control equipment for creating an adaptation of the contact means so as at least to offer a mechanical and electrical contact with said conductors,
 wherein coordination between the conductors put under voltage belonging to the roadway sections and the contact means of the vehicle occurs via coordinated current collectors in the form of contact springs, adapted for mechanical and electrical cooperation with respective ones of the conductors placed put under voltage,
 wherein the arrangement comprises a circuit for limiting the momentary power outlet connected to said vehicle-external power source, and being adapted to supply power to said conductor within the roadway section via said switch when the vehicle passes,
 wherein said vehicle comprises a transmitter adapted to transfer information to an electric station and its receiver in a forwardly located roadway section in front, informatory information of the vehicle corresponding to the requirement of power and/or energy of the vehicle while the vehicle passes over the forwardly located roadway section in front of the vehicle, and wherein the electric station is comprises a transmitter adapted to transfer information to a receiver belonging to the vehicle corresponding to a supply of power and/or energy which will be available when the vehicle passes over one or more of the forwardly located roadway sections.

2. The arrangement in accordance with claim 1, wherein a plurality of electric stations are connected to one superior feed station, and wherein when a vehicle by means of the transmitter sends a requesting information to the receiver of an electric station, said electric station is adapted to supply power and/or energy access only in response to received information from a superior feeding station.

3. The arrangement in accordance with claim 2, wherein the superior feeding station supplying a plurality of roadway sections is adapted to distribute the total power and/or energy supply between the electric stations and the associated vehicles in relation to time.

4. The arrangement in accordance with claim 1, wherein said vehicle by means of the transmitter is adapted to transmit requesting information to the electric station of a forwardly located roadway section in front of the vehicle and its receiver corresponding to the requirement of power and/or energy when the vehicle passes over a chosen plurality of forwardly located roadway sections, wherein the superior feeding station is adapted to receive said information and then feed information to relevant electric stations which unambiguously determines the allotted power and/or energy access of the superior feeding station during the time periods when said vehicle passes the forwardly located roadway sections associated with the superior feeding station and in dependence of instantaneous load distribution.

5. The arrangement in accordance with claim 1, wherein a roadway section supporting a vehicle feeds the battery set and/or the motor of the vehicle from a switch associated with the roadway section via its conductors and its vehicle-external power source, whereas electric conductors of an adjacent, forwardly located roadway section which are adapted to be controlled successively with regard to criteria of intact roadway section and thereafter be provided with a DC or AC feed voltage from the vehicle-external power source, or another source of power, via the switch associated with the roadway section only during the time periods when the vehicle passed the forwardly located roadway section and wherein at least two conductors of each roadway section can be supplied with the same feed voltage.

6. The arrangement in accordance with claim 1, wherein a switch is connected to the electric conductors of each or only chosen roadway sections, wherein the switch is connected to the conductors of a forwardly located roadway section in front of the vehicle, which are still not put under voltage, and wherein the switching means is adapted to activate the switch to supply a feed voltage to the conductors upon receipt of a clearing signal initiated by a supervisory circuit, after sensing an intact roadway section.

7. The arrangement in accordance with claim 6, wherein the supervisory circuit is adapted to verify that the conductors of the forwardly located roadway section in front of the vehicle are intact and to record an identity associated with the vehicle by means of a remote-controlled radio signal from the vehicle, as well as to activate the switch to supply a feed voltage to the conductor.

8. The arrangement in accordance with claim 1, wherein the properties of the conductor are adapted to the required power transmission for power feeding the battery set with a momentary high load during the time periods when the conductor drives the electric motor of the vehicle.

* * * * *